United States Patent
Liu et al.

(10) Patent No.: US 12,521,070 B2
(45) Date of Patent: Jan. 13, 2026

(54) METHOD, SYSTEM, WEARABLE DEVICE, AND MEDIUM FOR MEASURING A PHYSIOLOGICAL SIGNAL

(71) Applicant: Guangdong COROS Sports Technology Joint Stock Company, Guangdong (CN)

(72) Inventors: Naixi Liu, Guangdong (CN); Haotian Niu, Guangdong (CN); Yu Tang, Guangdong (CN)

(73) Assignee: GUANGDONG COROS SPORTS TECHNOLOGY JOINT STOCK COMPANY, Dongguan (CN)

( * ) Notice: Subject to any disclaimer, the term of this patent is extended or adjusted under 35 U.S.C. 154(b) by 491 days.

(21) Appl. No.: 17/989,059

(22) Filed: Nov. 17, 2022

(65) Prior Publication Data
US 2023/0148972 A1 May 18, 2023

(30) Foreign Application Priority Data

Nov. 18, 2021 (CN) .......................... 202111367421.4

(51) Int. Cl.
*A61B 5/00* (2006.01)
*A61B 5/024* (2006.01)

(52) U.S. Cl.
CPC ........ *A61B 5/7455* (2013.01); *A61B 5/02405* (2013.01); *A61B 5/6802* (2013.01); *A61B 2560/0276* (2013.01)

(58) Field of Classification Search
CPC . A61B 5/7455; A61B 5/02405; A61B 5/6802; A61B 2560/0276; A61B 5/0245
See application file for complete search history.

(56) References Cited

U.S. PATENT DOCUMENTS

| | | | |
|---|---|---|---|
| 2009/0012381 A1 | 1/2009 | Kuramori et al. | |
| 2009/0275805 A1* | 11/2009 | Lane | A61B 5/74 600/300 |
| 2017/0127954 A1 | 5/2017 | Tougasaki | |

(Continued)

FOREIGN PATENT DOCUMENTS

| | | |
|---|---|---|
| CN | 1572240 A | 2/2005 |
| CN | 2889161 Y | 4/2007 |

(Continued)

OTHER PUBLICATIONS

Office Action issued in Chinese Application No. 202111367421.4 dated Jan. 22, 2024 (19 pages).

(Continued)

*Primary Examiner* — Catherine M Voorhees
(74) *Attorney, Agent, or Firm* — Michael Best & Friedrich LLP

(57) ABSTRACT

Provided is a method, a system, a wearable device, and a medium for measuring a physiological signal. The method includes acquiring the physiological signal of a user, and controlling a haptic feedback device to activate to generate and output a haptic feedback signal in response to the physiological signal and starting a first timer simultaneously. When the time duration of the first timer is greater than a first time threshold, the first timer is stopped, the haptic feedback device is controlled to be disactivated, and a measuring result is output.

11 Claims, 5 Drawing Sheets

(56) References Cited

U.S. PATENT DOCUMENTS

| | | | |
|---|---|---|---|
| 2019/0282821 A1* | 9/2019 | Masuda | A61B 5/303 |
| 2020/0077954 A1* | 3/2020 | Bossetti | A61B 5/681 |
| 2021/0113099 A1* | 4/2021 | Rogers | A61B 5/682 |
| 2021/0161416 A1 | 6/2021 | Yamauchi | |
| 2021/0212620 A1* | 7/2021 | Galm | A61B 5/33 |

FOREIGN PATENT DOCUMENTS

| | | |
|---|---|---|
| CN | 102112853 A | 6/2011 |
| CN | 102655551 A | 9/2012 |
| CN | 202553905 U | 11/2012 |
| CN | 203861217 U | 10/2014 |
| CN | 105534511 A | 5/2016 |
| CN | 205514578 U | 8/2016 |
| CN | 107147783 A | 9/2017 |
| CN | 109328033 A | 2/2019 |
| CN | 209122219 U | 7/2019 |
| CN | 110367964 A | 10/2019 |
| CN | 110881965 A | 3/2020 |
| CN | 111096751 A | 5/2020 |
| JP | H10155748 A | 6/1998 |
| JP | 2008086770 A | 4/2008 |

OTHER PUBLICATIONS

European Patent Office Action for Related Application No. 22207975.8 dated Jan. 27, 2023 (9 pages).

\* cited by examiner

METHOD, SYSTEM, WEARABLE DEVICE, AND MEDIUM FOR MEASURING A PHYSIOLOGICAL SIGNAL

CROSS-REFERENCE TO RELATED APPLICATION(S)

This application claims priority to Chinese Patent Application No. 202111367421.4 filed Nov. 18, 2021, the disclosure of which is incorporated herein by reference in its entirety.

TECHNICAL FIELD

The present disclosure relates to the field of intelligent wearable devices and, in particular, to a method, a system, a wearable device, and a medium for measuring a physiological signal.

BACKGROUND

With the development of technology, intelligent wearable devices are widely used in people's lives. Wearable devices are worn on a user's body, and can track and measure physiological signals of the user in time.

Conventional physiological signal measurements, particularly heart rate variability (HRV) measurements, require the user to keep an eye on the measurement interface throughout the measurement process to ensure the stability of signal acquisition throughout the measurement process. Moreover, the measurement of certain physiological signals takes a relatively long time, for example, the HRV measurement takes 1 to 2 minutes. It is necessary for the user to keep attention to the measurement interface for a long time, which affects the use experience.

In addition, in the measurement process or when the related physiological signal is abnormal, most intelligent wearable devices only indicate the occurrence of an error, instead of the accurate type of the error, so the user cannot clearly know the specific type of the error reported by the measurement, and therefore cannot correct the error in time, thereby causing inconvenience to the user.

SUMMARY

The present embodiments of the disclosure provide a method, a system, a wearable device, and a medium for measuring a physiological signal to solve the problem that a user cannot obtain measurement feedback information in time in the related art which affects the use experience.

In the first aspect, the present embodiments of the disclosure provide a method for measuring a physiological signal. The method includes receiving a physiological signal measuring instruction; in response to the physiological signal measuring instruction, starting the physiological signal measuring; acquiring the physiological signal of a user; in response to the physiological signal, controlling a haptic feedback device to activate to generate and output a haptic feedback signal; and starting a first timer simultaneously; and when the time duration of the first timer is greater than a first time threshold, controlling the haptic feedback device to be disactivated and stopping the physiological signal measurement, and outputting the measurement result.

In the second aspect, the present embodiments of the disclosure provide a non-transitory computer-readable storage medium, where a computer program is stored, and the computer program is executed to implement the method for measuring a physiological signal provided by any of the present embodiments of the disclosure.

In the third aspect, the present embodiments of the disclosure provide a system for measuring a physiological signal. The system includes as follows.

An acquisition device for the physiological signal is configured to receive a physiological signal measuring instruction; in response to the physiological signal measuring instruction, start a physiological signal measuring; and acquire the physiological signal of a user.

A haptic feedback device is configured to generate a haptic feedback signal corresponding to the physiological signal.

A timer device is provided.

A control device is connected to the physiological signal acquisition device, the haptic feedback device and the timer device in a one-to-one manner, for controlling the haptic feedback device to activate to generate a haptic feedback signal in response to the physiological signal. when the time duration of a first timer of the timer device is greater than a first time threshold, the haptic feedback device is controlled to be disactivated and output the measurement result.

In a fourth aspect, the present embodiments of the disclosure also provide a wearable device including a system for measuring a physiological signal provided by any of the present embodiments of the disclosure.

In the present disclosure, a physiological signal acquisition device is provided to acquire the physiological signal of a user. A haptic feedback device generates a haptic feedback signal corresponding to the physiological signal. The control device controls the haptic feedback device to activate to generate the haptic feedback signal in response to the physiological signal. When the time duration of a first timer of the timer device is greater than a first time threshold, the haptic feedback device is controlled to be disactivated, and the measurement result is output. In this manner, the user can be ensured to complete a whole physiological signal measurement, and a haptic feedback signal is sent through the haptic feedback device to prompt the start and end of the physiological signal measurement so that the user does not need to keep an eye on the test interface, thereby reducing the use burden of the user. What's more, during measurement, the haptic feedback device provides corresponding haptic feedback along with the detection of the measurement signal and the fluctuation of the signal, which promotes the user's use experience.

DETAILED DESCRIPTION

Figure 1:
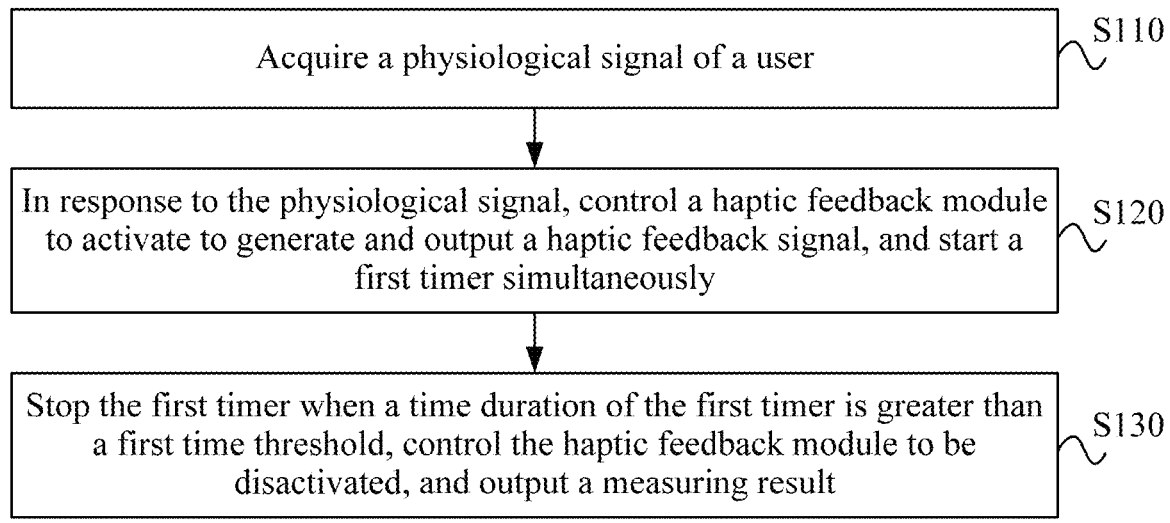
FIG. 1 is a flowchart of the method for measuring a physiological signal provided in the embodiment one of the disclosure.

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure are illustrated in the drawings.

Embodiment One

FIG. 1 is a flowchart of the method for measuring a physiological signal provided in the embodiment one of the disclosure. The method for measuring a physiological signal can be used to measure the physiological signal of a user. As shown in FIG. 1, the method includes the steps below.

In S110, the physiological signal of a user is acquired.

Before the step in that the physiological signal of a user is acquired, the method further includes receiving a physiological signal measuring instruction; and in response to the physiological signal measuring instruction, starting the physiological signal measuring.

The physiological signal of the user is the physiological parameters of the user, and the physiological signal of the user may include multiple physiological signals such as heart rate, electrocardio (ECG), temperature, blood pressure, and activity state of the user, which is not limited by the present embodiment.

In addition, the physiological signal of the user may be acquired by a physiological signal acquisition device. The device may include a sensor device. The specific arrangement of the sensor device is not limited by the present embodiment of the disclosure. For example, the sensor may include, at least one of an ECG sensor, an EEG sensor, an EMG sensor, a skin inductance sensor, a photovoltaic scanning sensor, an infrared light spectrum sensor, or a respiration sensor, or a combination of the above sensors. For each of the above sensors, those skilled in the art may arrange them according to actual requirements.

In terms of an example where the physiological signal of the user to be collected is a heart rate signal, an ECG sensor may be provided in the sensor device. The two electrodes of the ECG sensor are in contact with the body of the user to acquire a heart rate signal generated by the heart activity of the user, and the heart rate signal may be used for monitoring the HRV. The working principle for acquiring physiological signals based on sensors may refer to the related art, and the details are not repeated here.

In an embodiment, specific steps of acquiring the physiological signal of the user may be the user turning on the physiological signal measurement mode, a control device sending a start instruction to activate the physiological signal acquisition device, and the sensor device of the physiological signal acquisition device starting to measure the physiological signal of the user.

In S120, a haptic feedback device is controlled to be activated to generate and output a haptic feedback signal in response to the physiological signal, and a first timer is started simultaneously.

It is to be understood that when a user needs to measure the physiological signal, the physiological signal measurement mode is first turned on. After the mode is turned on, the physiological signal acquisition device starts to collect the physiological signal of the user. After the physiological signal acquisition device acquires the physiological signal of the user, the physiological signal is sent to the control device. In response to the physiological signal, the control device activates the haptic feedback device. After the haptic feedback device is activated, the haptic feedback signal is generated to remind the user that the measurement is on.

In an embodiment, particular types of haptic feedback signals are not limited by the present embodiment of the disclosure, and any related art that can perform the haptic feedback in the present disclosure may be employed. The preferable embodiment of the disclosure is that a haptic feedback signal that delivers contact stimuli directly or indirectly to at least one point of the user's body. Any actuating element may be provided in the haptic feedback device to emit a haptic feedback signal. For example, a vibrating element or a knocking element or the like may be provided in the haptic feedback device. Preferably, a vibration motor is disposed in the haptic feedback device of the present embodiment of the disclosure. When the haptic feedback device is activated, the vibration motor in the haptic feedback device starts to vibrate to generate a haptic feedback signal.

The haptic feedback device generates the haptic feedback signal and output the haptic feedback signal so that the user perceives the prompted information more clearly, and decides how to act in the subsequent physiological signal measurement process corresponding to the type of the physiological signal measurement made at this time. For example, when the heart rate is measured, a user should not move strenuously and keep as stable as possible. The haptic feedback device effectively avoids the situation where the user does not know that the physiological signal has started to be measured, and does an action that affects the measurement result, causing the measurement result to be inaccurate or unable to complete. Moreover, the prompted haptic feedback signal reliefs the user from continuously paying attention on the measurement interface so that the user's use experience is promoted.

In an embodiment, the frequency, duration or intensity of the motor vibration may be set according to actual conditions, for example, according to the user's perceiving ability, which is not limited by the present embodiment of the disclosure. In the present embodiment of the disclosure, when the HRV measurement is performed, the vibrating element or the knocking element in the haptic feedback device may be set to vibrate or knock at the same frequency as the heart rate of the user so that the user can clearly perceive that the motor is vibrating at the same phase and frequency of the heartbeat during the measurement, thereby determining that the measurement is normally performed.

Figure 2:
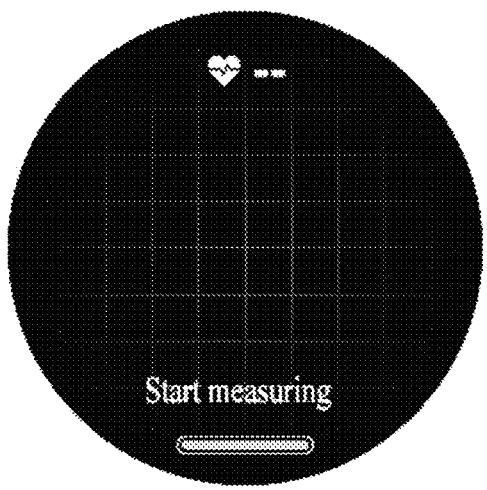
FIG. 2 is an interface diagram when the measurement starts according to the method for measuring a physiological signal provided in the embodiment one of the disclosure.
Figure 3:
FIG. 3 is an interface diagram of the measurement duration according to the method for measuring a physiological signal provided in the embodiment one of the disclosure.
Figure 4:
FIG. 4 is another interface diagram of the measurement duration according to the method for measuring a physiological signal provided in the embodiment one of the disclosure.

In an embodiment, while sending the haptic feedback signal, the control device may further control the visual feedback device and/or the auditory feedback device to provide visual feedback and/or auditory feedback to the user. Still in terms of an example of the HRV measurement, as shown in FIGS. 2 to 4, FIG. 2 is an interface diagram when the measurement starts according to the method for measuring a physiological signal provided in the embodiment one of the disclosure. FIG. 3 is an interface diagram of the measurement duration according to the method for measuring a physiological signal provided in the embodiment one of the disclosure. FIG. 4 is another interface diagram of the measurement duration according to the method for measuring a physiological signal provided in the embodiment one of the disclosure. When the HRV measurement is started, the visual feedback device, that is, the display screen, may display "start measurement", and the auditory feedback device, that is, the speaker, may emit a sound "start measurement" when the haptic feedback device sends the haptic feedback signal. Further, during the measurement, the display screen may display the measurement duration, for example, displaying the measurement time or a countdown time to remind the user of the end time of the measurement and improve the user's use sense. In FIGS. 3 and 4, the measurement duration is shown as a countdown time.

In addition, the control device may send a first timer signal to the timer device while sending an activation signal to the haptic feedback device. The timer device starts the first timer after receiving the first timer signal, that is, starts to measure the physiological signal of the user, and records the data of the measured physiological signal. The storage of the signal data may be performed by the control device, or a storage device may be provided to store the physiological signal of the user. The preferably embodiment of the disclosure is that the data of the measured physiological signal is stored by the storage device. To provide a storage device, it is ensured that the data of the measured physiological signal can be called out immediately when the user wants to check it, and the operating pressure of the control device can be reduced to ensure normal operation of the other parts in the control device.

In S130, when the time duration of a first timer is greater than a first time threshold, the first timer is stopped, the haptic feedback device is controlled to be disactivated and the physiological signal measurement is stopped, and the measurement result is output.

The first time threshold is the total duration of completing a physiological signal measurement, and the specific value may be set according to the actual situation. When the time duration of the first timer is greater than the first time threshold, it indicates that a physiological signal measurement has been completed. At this time, the control device may send a stop signal to the first timer of the timer device, and the timer device stops the first timer. At the same time, the control device controls the haptic feedback device to be disactivated. In that case, no haptic feedback signal is output to the user, and a measurement result is output to the display screen for the user to view. Still in terms of an example where a vibration motor is provided in the haptic feedback device, at this time, the vibration motor is controlled to stop to indicate the user that the physiological signal measurement is completed, and the measurement result can be viewed.

According to the technical solution provided by the embodiment one of the disclosure, by setting a first time threshold and stopping sending the haptic feedback signal when the time duration of the first timer is greater than the first time threshold, the user can be ensured to complete a whole physiological signal measurement, and a haptic feedback signal is sent through the haptic feedback device to prompt the start and end of the physiological signal measurement so that the user does not need to keep an eye on the test interface, thereby promoting the user's use experience.

Embodiment Two

Figure 5:
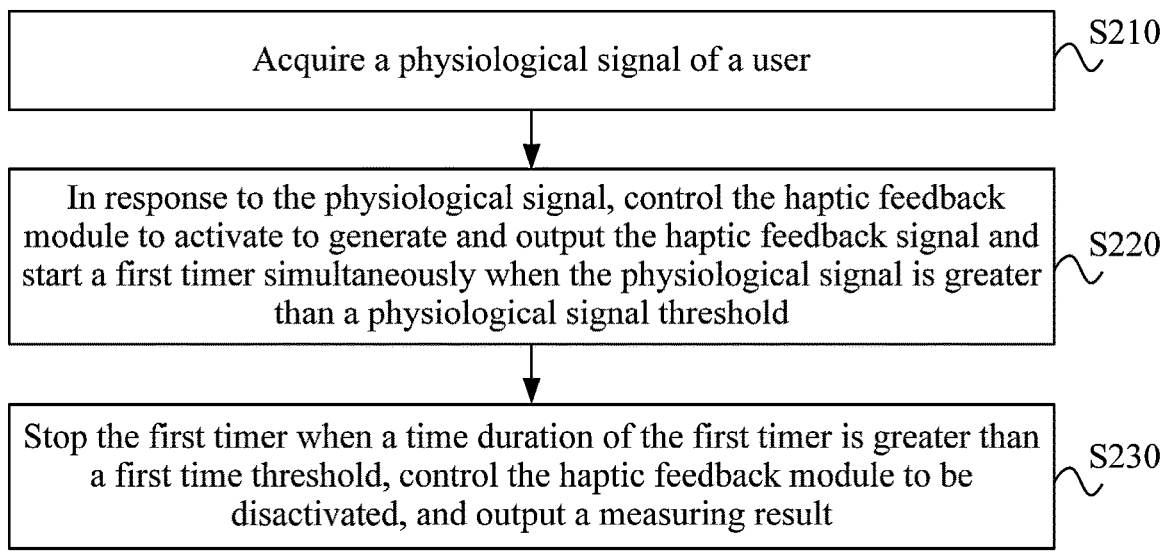
FIG. 5 is a flowchart of the method for measuring a physiological signal provided in the embodiment two of the disclosure.

FIG. 5 is flowchart of the method for measuring a physiological signal provided in the embodiment two of the disclosure, which is further refined on the basis of the above-mentioned embodiment and may include the steps below.

In S210, the physiological signal of a user is acquired.

In S220, in response to the physiological signal, when the physiological signal is greater than a physiological signal threshold, the haptic feedback device is controlled to be activated to generate and output a haptic feedback signal and the first timer is started simultaneously.

The physiological signal threshold is the physiological signal measured when the user is stable in the physiological signal measurement state. The physiological signal threshold can be stored in a comparison device in advance. In an embodiment, the physiological signal acquisition device can send the acquired physiological signal to the comparison device. In the comparison device, the acquired physiological signal is compared with the physiological signal threshold. When the acquired physiological signal is greater than the physiological signal threshold, the control device controls the haptic feedback device to be activated. Still in terms of an example of the HRV measurement, the HRV measurement needs to acquire the heart rate signal of a user. In this case, the physiological signal threshold may preferably be greater than or equal to 5 RR intervals. The RR intervals refer to the time between two R waves on the electrocardiogram and are used to calculate the ventricular rate. If the physiological signal threshold is set to 5 RR intervals, when the number of RR intervals in the measured heart rate signal is greater than 5, the state of the user is relatively stable. In this case, the first timer can be formally started and the heart rate signal of the user can be measured. Then the haptic feedback device outputs a haptic feedback signal, indicating that the formal measurement of the user is started.

The setting of the specific value of the physiological signal threshold is not limited by the present embodiment of the disclosure thereto. In an embodiment, the physiological signal thresholds may be the average physiological signals of different types of physiological signals obtained in advance by a product-maker according to the result of experiments, and the average physiological signals are stored in the comparison device. The user selects the average physiological signal value according to the measurement type. In addition, the physiological signal threshold may be input and saved by a user according to the situation of the user. The present embodiment of the disclosure is not limited thereto. Preferably, the physiological signal threshold is input and saved by the user. The physiological signal pre-stored by the user is used as the physiological signal threshold. When the physiological signal acquired by the physiological signal acquisition device is greater than the physiological signal threshold, the control device activates the haptic feedback device, and the haptic feedback device generates a haptic feedback signal to indicate that the user has started to perform the physiological signal measurement, and the timer device starts the first timer.

In an embodiment, if the acquired physiological signal is less than or equal to the physiological signal threshold, it indicates that the user may be unstable, and then S210 is repeated to continue acquiring the physiological signal of the user until the acquired physiological signal is greater than the physiological signal threshold.

In S230, when the time duration of a first timer is greater than a first time threshold, the first timer is stopped, the haptic feedback device is controlled to be disactivated, and the measurement result is output.

According to the technical solution provided in embodiment two of the disclosure, by setting a physiological signal threshold, when the comparison device judges that the acquired physiological signal is greater than the physiological signal threshold, the comparison device starts to formally perform physiological signal measurement. In this manner, it is ensured that the user starts to acquire and record the physiological signal after reaching the stable state required for measurement, thus avoiding the error caused by direct measuring, and further ensuring the accuracy of the user's physiological signal measurement.

Embodiment Three

Figure 6:
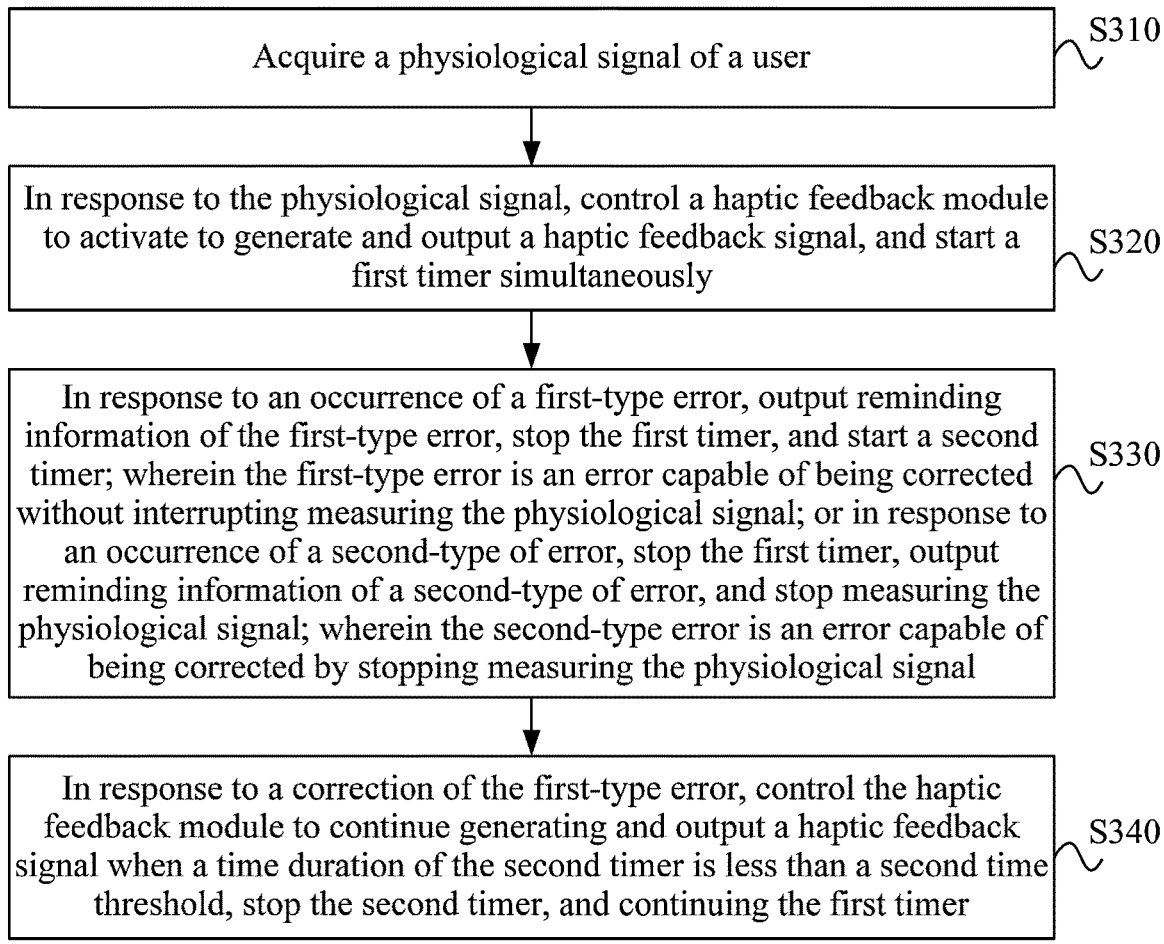
FIG. 6 is a flowchart of the method for measuring a physiological signal provided in the embodiment three of the disclosure.

FIG. 6 is flowchart of the method for measuring a physiological signal provided in the embodiment three of the disclosure, which is further refined on the basis of the above-mentioned embodiment and may include the steps below.

In S310, the physiological signal of a user is acquired.

In S320, in response to the physiological signal, a haptic feedback device is controlled to be activated to generate and output a haptic feedback signal, and a first timer is started simultaneously.

In S330, in response to the occurrence of a first-type error, reminding information of the first-type error is output, the first timer is stopped, and a second timer is started. The first-type error is an error that after being corrected the physiological signal measurement can be continued. Or in response to the occurrence of a second-type of error, the first timer is stopped, reminding information of the second-type error is output, and the measurement of the physiological signal is stopped. the second-type error is an error that can be corrected by terminating physiological signal measurements.

The first-type error is an error that after being corrected the physiological signal measurement can be continued, that is, after being reminded of an error, the user only needs to correct the error according to the reminding content, and does not need to terminate the physiological signal measurement. The first-type error may at least include an error caused by instable electrodes caused by the movement of a user during measurement, or an error caused by an inability to acquire the physiological signal due to poor contact of electrodes with the user's body.

When such an error occurs, the control device may send a first error signal to the error reminding device, and the error reminding device outputs reminding information of the first-type error after receiving the first error signal. In addition, for different types of the first-type error, the error reminding device may output reminding information of different first-type errors. Meanwhile, the control device may send a stop signal to the first timer of the timer device to control the timer device to stop the first timer and turn on the second timer. In an embodiment, in response to the time duration of the second timer being greater than the second time threshold, the second-type error is generated. If the time duration of the second timer exceeds the second time threshold, it indicates that the user attempts to correct the first-type error after receiving reminding information of the first-type error, but fails to correct the corresponding error. At this time, the error reminding device outputs reminding information of the second error, reminding the user of ending the current measurement of the physiological signal, and restarting a measurement. The specific value of the second time threshold may be set according to the actual situation, for example, may be set to two minutes. When the time duration of the second timer exceeds two minutes, reminding information of the second error is output.

The second-type error is an error that can only be corrected by stopping measuring the physiological signal. When a second-type error occurs, the control device may send a stop signal to the first timer of the timer device to control the timer device to stop the first timer. At the same time, the control device may send a second error signal to the error reminding device. After receiving the second error signal, the error reminding device outputs reminding information of the second-type error and terminates the physiological signal measurement.

In an embodiment, the storage device may also record the second-type error. When the number of times of occurrence of the second-type error exceeds a set threshold, the storage device may remind the user of detecting the system for measuring a physiological signal, and upgrading the system in time to ensure that the system runs smoothly.

In an embodiment, in response to the occurrence of a first-type error, the haptic feedback device may be controlled to be disactivated. Before the haptic feedback device is controlled to continue generating and outputting the haptic feedback signal, the method may also include controlling the haptic feedback device to activate.

After the occurrence of the first-type error, the control device controls the haptic feedback device to be disactivated and no longer provide feedback to the user so that when the user suddenly cannot perceive the physiological signal, and a warning is generated to the user. After the first-type error is successfully corrected, the control device sends an activation signal to the haptic feedback device, and controls the haptic feedback device to be reactivated and continue generating and outputting the haptic feedback signal.

In an embodiment, reminding information of the first-type error and/or reminding information of the second-type error may be set according to actual requirements. The specific reminding mode is not limited by the present embodiment of the disclosure. Any method capable of sending reminding information of an error is within the protection scope of the present embodiment of the disclosure. However, it should be noted that reminding information of the first-type error and reminding information of the second-type error are at least one of auditory feedback information, haptic feedback information or visual feedback information, where the haptic feedback information is different from the haptic feedback signal. Reminding information of the first-type error and/or reminding information of the second-type error may be either one or a combination of the feedback information. When visual feedback is promoted, reminding information of the first-type error and/or reminding information of the second-type error may be either a reminding information of an error type or correction information of the occurred error, which is not limited by the present embodiment of the disclosure. Preferably, correction information of the occurred error is provided so that the user can correct the error in a correct manner, thereby successfully completing the measurement of the physiological signal.

In addition, when information feedback is performed by a haptic feedback device, the haptic feedback signal sent by the haptic feedback device is different from the haptic feedback information corresponding to reminding information of the first-type error and/or reminding information of the second-type error. For example, if the haptic feedback signal at the start of the measurement is a vibration as the same frequency as the pulse, the haptic feedback information corresponding to reminding information of the first-type error may be a frequency vibration slower than the pulse frequency, and reminding information of the second-type error may be a frequency vibration faster than the pulse frequency. In addition, the vibration motor in the haptic feedback device may be arranged to provide feedback of different reminding information of errors with different vibration duration and/or vibration frequency and/or vibration intensity.

By setting different haptic feedback information for different reminding information of errors, when an error occurs in a measurement process, a user can distinguish an error type through the haptic sense, and make corresponding correction actions for different error types in time so that an error can be quickly solved and the user satisfaction can be improved.

Figure 7:
FIG. 7 is an interface diagram of the first-type error according to the method for measuring a physiological signal provided in the embodiment three of the disclosure.
Figure 8:
FIG. 8 is another interface diagram of the first-type error according to the method for measuring a physiological signal provided in the embodiment three of the disclosure.

The working principle of the error reminding device would be interpreted in terms of two typical errors of the first-type error as an example. FIG. 7 is an interface diagram of the first-type error according to the method for measuring a physiological signal provided in the embodiment three of the disclosure. FIG. 8 is another interface diagram of the first-type of error according to the method for measuring a physiological signal provided in the embodiment three of the disclosure. When a motion detection device such as an acceleration sensor in a system for measuring a physiological signal detects that the acceleration of a user is greater than a preset acceleration threshold, and the measured physiological signal is less than the physiological signal threshold, the control device controls the error reminding device to output a corresponding error reminding signal. For example, as shown in FIG. 7, display and/or emit "please keep still" on the display screen and/or by the microphone, and/or the vibration motor of the haptic feedback device vibrates vibrate at a slower frequency. When the control device detects that the contact capacitance of the sensor electrode is less than a preset capacitance threshold, as shown in FIG. 8, the error reminding device may output "hold the metal label with your right hand" on the display screen and/or by the microphone of the auditory feedback device, and/or the vibration motor of the haptic feedback device is controlled by the control device to vibrate at a slower frequency to remind the user to keep the electrode in contact with the body. The vibration frequency corresponding to this error may be set differently from the vibration frequency corresponding to other errors to accurately provide feedback of error information. Both the acceleration threshold and the capacitance threshold may be set according to actual conditions, and is not limited by the present embodiment.

In an embodiment, when a second-type error occurs, the control device may control the error reminding device to output corresponding reminding information of the error. For example, "the second-type error occurs, please restart measurement" displayed on the display screen and/or emitted by the microphone, and/or the vibration motor in the haptic feedback device vibrates at a faster frequency to prompt the second-type error. In terms of an example of the HRV measurement, FIG. 9 is an interface diagram of the second-type error according to the method for measuring a physiological signal provided in the embodiment three of the disclosure.

Figure 9:
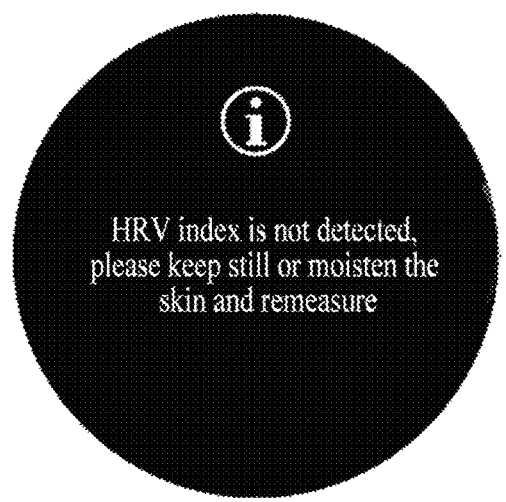
FIG. 9 is an interface diagram of the second-type error according to the method for measuring a physiological signal provided in the embodiment three of the disclosure.

As shown in FIG. 9, when a second-type error occurs, the display screen may display "HRV index is not detected, please keep still or moisten the skin and remeasure", and the haptic feedback device and the auditory feedback device may also make corresponding prompts to remind the user that the remeasurement may be required.

The error reminding device accurately reminds the possible errors in the measurement, solves the problem that the related art cannot divide the error types so that the errors cannot be corrected in time, brings convenience to the measurement of the user, and further improves the use experience of the user.

In S340, in response to correction of the first-type error, the haptic feedback device is controlled to continue generating and outputting the haptic feedback signal when the time duration of the second timer is less than the second time threshold, the second timer is stopped, and the first timer is continued.

Specifically, the user completes the correction of the first-type error, and the time duration of the second timer is less than the second time threshold, indicating that the first-type error has been resolved, and the physiological signal of the user can continue to be measured. At this time, the control device may control the haptic feedback device to continue generating and outputting a haptic feedback signal. At the same time, the timer device stops the second timer, continues the first timer, and completes the entire physiological signal measurement process.

According to the technical solution in the embodiment three of the disclosure, errors that may occur in the physiological signal process is reminded, and remeasurement is automatically started after correction. In this manner, intelligence of the physiological signal measurement is improved, and users can accurately identify the error types and correct the error. When the error that occurs cannot be repaired, the error can also be recorded, thereby greatly improving the user's use sense.

Embodiment Four

The present embodiment four of the disclosure also provides a computer-readable storage medium, where a computer program is stored, and computer program is executed to implement the method for physiological signal measurement provided by any of the present embodiments of the disclosure.

According to the technical solution provided in the embodiment four of the disclosure, a physiological signal acquisition device is provided to acquire the physiological signal of a user. A haptic feedback device generates a haptic feedback signal corresponding to the physiological signal. The control device controls the haptic feedback device to activate to generate the haptic feedback signal in response to the physiological signal. When the time duration of a first timer of the timer device is greater than a first time threshold, the haptic feedback device is controlled to close, and the measurement result is output. In this manner, the user can be ensured to complete a whole physiological signal measurement, and a haptic feedback signal is sent through the haptic feedback device to prompt the start and end of the physiological signal measurement so that the user does not need to keep an eye on the test interface, and the use experience of the user is promoted.

Embodiment Five

Figure 10:
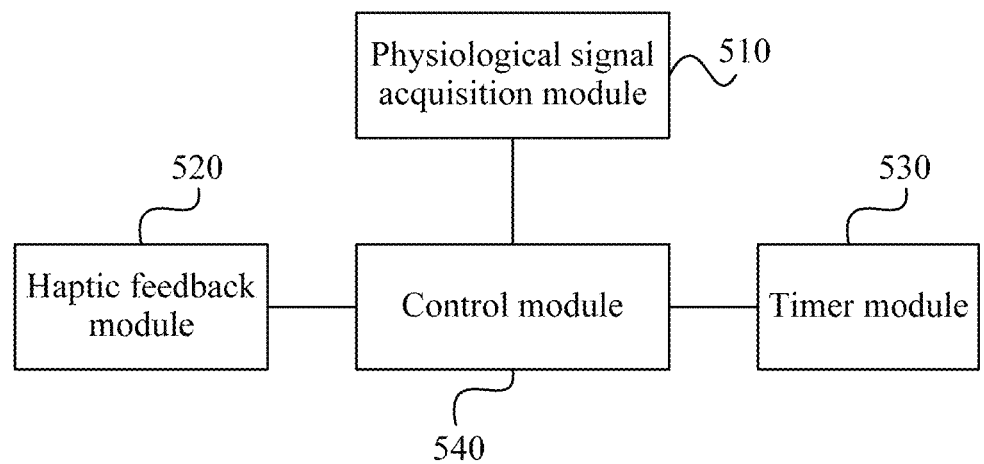
FIG. 10 is a view of the system for measuring a physiological signal provided in the embodiment five of the disclosure.

The present embodiment of the disclosure also provides a system for measuring a physiological signal that can perform the method for measuring a physiological signal provided by any of the present embodiments of the disclosure. The system has function devices corresponding to the method and the same benefits as the method, and the system can be implemented in software and/or hardware, and can be generally integrated in a server or a terminal device. FIG. 10 is a view of the system for measuring a physiological signal provided in the embodiment five of the disclosure. Referring to FIG. 10, the system includes as follows.

A physiological signal acquisition device 510 is configured to acquire the physiological signal of a user.

A haptic feedback device 520 is configured to generate a haptic feedback signal corresponding to the physiological signal.

A timer device 530 is provided.

A control device 540 is connected to the physiological signal acquisition device 510, the haptic feedback device 520, and the timer device 530 in a one-to-one manner, for controlling the haptic feedback device 520 to activate to generate a haptic feedback signal in response to the physiological signal, and controlling the haptic feedback device 520 to be disactivated and output the measurement result when the time duration of a first timer of the timer device 530 is greater than the first time threshold.

In an embodiment, the physiological signal acquisition device 510 may include a sensor device. The specific arrangement of the sensor device is not limited by the present embodiment of the disclosure. For example, the sensor may include, at least one of an ECG sensor, an EEG sensor, an EMG sensor, a skin inductance sensor, a photovoltaic scanning sensor, an infrared light spectrum sensor, or a respiration sensor, or a combination of the above sensors. For each of the above sensors, those skilled in the art may arrange them according to actual requirements.

For example, if the physiological signal to be measured by the user is a heart rate signal, an ECG sensor may be provided in the sensor device, and two electrodes of the ECG sensor are in contact with the body of the user to acquire the heart rate signal generated by the heart activity of the user, which can be used to monitor the HRV. The working principle for acquiring physiological signals based on sensors may refer to the related art, and the details are not repeated here.

In an embodiment, any actuating element may be provided in the haptic feedback device 520 to emit a haptic feedback signal. For example, a vibrating element or a knocking element or the like may be provided in the haptic feedback device 520. Preferably, a vibration motor is disposed in the haptic feedback device 520 of the present embodiment of the disclosure. When the haptic feedback device 520 is activated, the vibration motor in the haptic feedback device 520 starts to vibrate to generate a haptic feedback signal.

In an embodiment, the system may further include a storage device that stores the measured physiological signal data of the user so that the user can call out the physiological signal data immediately when the user wants to check it.

In an embodiment, the system may also include the follows devices.

A comparison device is connected to the physiological signal acquisition device 510 and the control device 540, for comparing a physiological signal value acquired by the physiological signal acquisition device 510 with the physiological signal threshold. The control device 540 is used for controlling the haptic feedback device 520 to activate when the physiological signal is greater than the physiological signal threshold.

The physiological signal threshold is the physiological signal measured when the user is stable in the physiological signal measurement state. The physiological signal threshold is stored in the comparison device in advance. In an embodiment, the physiological signal acquisition device 510 sends the collected physiological signal to the comparison device. In the comparison device, the acquired physiological signal is compared with the physiological signal threshold. When the acquired physiological signal is greater than the physiological signal threshold, the control device 540 controls the haptic feedback device 520 to be activated, and the haptic feedback device 520 outputs a haptic feedback signal to prompt the user that the formal measurement is started.

In an embodiment, the system may further include an error reminding device.

The control device 540 stops the first timer, starts the second timer, and controls the error reminding device to output reminding information of the first-type error in response to the occurrence of the first-type error. The first-type error is an error that after being corrected the physiological signal measurement can be continued; or in response to the occurrence of the second type of error, the control device 540 stops the first timer and controls the error reminding device to output reminding information of the second type of error. The second type of error is an error that can be corrected by stopping measuring the physiological signal.

Specifically, in response to the occurrence of the first-type error, the control device 540 is also configured to stop the first timer, start the second timer, and send a first error signal to the error reminding device. The error reminding device outputs reminding information of the first-type error after receiving the first error signal.

In response to the occurrence of the second-type error, the control device 540 is configured to stop the first timer and send a second error signal to the error reminding device. The error reminding device outputs reminding information of the second-type error after receiving the second error signal.

In an embodiment, the control device 540 is also configured to generate the second-type error in response to the time duration of the second timer being greater than a second time threshold. After the error reminding device outputs reminding information of the first-type error, the first timer stops and the second timer starts. If the time duration of the second timer exceeds the second time threshold, it indicates that the user attempts to correct the first-type error after receiving reminding information of the first-type error, but fails to correct the corresponding error. At this time, the control device 540 is configured to control the error reminding device to output reminding information of the second error, reminding the user of ending the current measurement of the physiological signal, and restarting a measurement.

In an embodiment, the storage device may also record the second-type error. When the number of times of occurrence of the second-type error exceeds a set threshold, the storage device may remind the user of detecting the system for measuring a physiological signal, and upgrading the system in time to ensure that the system runs smoothly.

In an embodiment, the control device 540 is also configured to control the haptic feedback device 520 to be disactivated in response to the occurrence of the first-type error. Before the control haptic feedback device 520 continues generating and outputting the haptic feedback signal, the system may also include controlling the haptic feedback device 520 to activate.

Specifically, after the occurrence of the first-type error, the control device 540 controls the haptic feedback device 520 to be disactivated and no longer provide feedback to the user. After the first-type error is successfully corrected, the control device 540 sends an activation signal to the haptic feedback device 520, and controls the haptic feedback device 520 to be reactivated and continue generating and outputting the haptic feedback signal.

In an embodiment, reminding information of the first-type error and/or reminding information of the second-type error may be set according to actual requirements. The specific reminding mode is not limited by the present embodiment of the disclosure. Any method capable of sending reminding information of an error is within the protection scope of the present embodiment of the disclosure. However, it is worth mentioning that reminding information of the first-type error and reminding information of the second-type error may be at least one of auditory feedback information, haptic feedback information, or visual feedback information, where the haptic feedback information is different from the haptic feedback signal. The relevant content has been described in embodiment three. The details are not repeated here.

In an embodiment, in response to correction of the first-type error, the control device 540 is also configured to control the haptic feedback device 520 to continue generating and outputting the haptic feedback signal, stop the second timer, and continue the first timer, when the time duration of the second timer is less than the second time threshold.

Specifically, the user completes the correction of the first-type error, and the time duration of the second timer is less than the second time threshold, indicating that the first-type error has been resolved, and the physiological signal of the user can continue to be measured. At this time, the control device 540 may control the haptic feedback device 520 to continue generating and outputting a haptic feedback signal. At the same time, the timer device 530 stops the second timer, continues the first timer, and completes the entire physiological signal measurement process.

In an embodiment, the system may further include a visual feedback device, for example, a display screen, for displaying feedback information such as physiological signal measurement results, reminding information of errors, and measurement duration information.

In an embodiment, the system may further include an auditory feedback device that may provide a speaker or the like for playing feedback information such as reminding information of errors and measurement duration information.

In a practical application, the timer device 530, the control device 540, the comparison device may all be implemented by a Central Processing Unit (CPU), a Digital Signal Processor (DSP) or a Field-Programmable Gate Array (FPGA) in the system for measuring the physiological signal.

According to the technical solution provided in the embodiment five of the disclosure, a physiological signal acquisition device is provided to acquire the physiological signal of a user. A haptic feedback device generates a haptic feedback signal corresponding to the physiological signal. The control device controls the haptic feedback device to activate to generate the haptic feedback signal in response to the physiological signal. When the time duration of a first timer of the timer device is greater than a first time threshold, the haptic feedback device is controlled to close, and the measurement result is output. In this manner, the user can be ensured to complete a whole physiological signal measurement, and a haptic feedback signal is sent through the haptic feedback device to prompt the start and end of the physiological signal measurement so that the user does not need to keep an eye on the test interface, and the use experience of the user is promoted.

In addition, when the comparison device judges that the acquired physiological signal is greater than the physiological signal threshold, the comparison device starts to formally perform physiological signal measurement. In this manner, it is ensured that the user starts to acquire and record the physiological signal after reaching the stable state required for measurement, thus avoiding the error caused by direct measuring, and further ensuring the accuracy of the user's physiological signal measurement. The setting of the error reminding device can remind an error that may occur in the physiological signal process, and automatically starts remeasurement after correction so that the intelligence of the physiological signal measurement is improved, the user can accurately identify the error type and correct the error. When the error cannot be repaired, the error can also be recorded, thereby further enhancing the user's use sense.

Embodiment Six

The present embodiment of the disclosure also provides a wearable device including a system for measuring a physiological signal provided by any embodiment of the present disclosure. The wearable device has all the technical features and corresponding benefits of the system for measuring a physiological signal provided by any embodiment of the present disclosure. The details are not repeated here.

It is to be noted that the above are only preferred embodiments of the present disclosure and the technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A method for measuring a physiological signal, comprising:
   receiving a physiological signal measuring instruction;
   in response to the physiological signal measuring instruction, starting the physiological signal measuring;
   acquiring a physiological signal of a user;
   in response to acquiring the physiological signal, controlling a haptic feedback device to activate to generate and output a haptic feedback signal; and starting a first timer simultaneously; and
   when a time duration of the first timer is greater than a first time threshold, controlling the haptic feedback device to be disactivated, and stopping the physiological signal measurement and outputting a measuring result,
   wherein the method further comprises:
   in response to an occurrence of a first-type error, outputting reminding information of the first-type error, stopping the first timer, and starting a second timer; wherein the first-type error is an error capable of being corrected without interrupting measuring the physiological signal, and
   wherein after starting the second timer, the method further comprises:

in response to a correction of the first-type error, controlling the haptic feedback device to continue generating and outputting a haptic feedback signal when a time duration of the second timer is less than a second time threshold, stopping the second timer, and continuing the first timer.

2. The method for measuring a physiological signal according to claim 1,
wherein in response to the physiological signal, controlling the haptic feedback device to activate to generate and output the haptic feedback signal comprises:
when a physiological signal value is greater than a physiological signal threshold, controlling the haptic feedback device to activate to generate and output the haptic feedback signal.

3. The method for measuring a physiological signal according to claim 1, wherein reminding information of the first-type error comprises at least one of auditory feedback information, haptic feedback information, or visual feedback information, wherein the haptic feedback information is different from the haptic feedback signal.

4. The method for measuring a physiological signal according to claim 1, wherein after in response to the occurrence of the first-type error, the method further comprises:
controlling the haptic feedback device to be disactivated.

5. A non-transitory computer-readable storage medium, wherein a computer program is stored, and the computer program is executed to implement the method for measuring the physiological signal of claim 1.

6. A system for measuring a physiological signal, comprising:
a physiological signal acquisition device configured to receive a physiological signal measuring instruction; in response to the physiological signal measuring instruction, start a physiological signal measuring; and acquire a physiological signal of a user;
a haptic feedback device configured to generate a haptic feedback signal corresponding to the physiological signal;
a timer device; and
a control device, wherein the control device is respectively connected to the physiological signal acquisition device, the haptic feedback device and the timer device, and the control device is configured to in response to the acquired physiological signal, control the haptic feedback device to activate to generate a haptic feedback signal, and control the haptic feedback device to be disactivated and stop the physiological signal measurement and output a measurement result when a time duration of a first timer of the timer device is greater than a first time threshold,
wherein the system further comprises an error reminding device,
wherein the control device is configured to: in response to an occurrence of the first-type error, stop the first timer, start the second timer, and control the error reminding device to output reminding information of a first-type error, wherein the first-type error is an error capable of being corrected without interrupting measuring the physiological signal, and
wherein the control device is configured to stop the second timer and continue to control the haptic feedback device to continue generating and outputting a haptic feedback signal in response to a correction of the first-type error and when a time duration of the second timer is less than a second time threshold.

7. The system for measuring a physiological signal according to claim 6, the system further comprises:
a comparison device connected to the physiological signal acquisition device and the control device, wherein the comparison device is configured to compare a physiological signal value acquired by the physiological signal acquisition device with a physiological signal threshold, and the control device is configured to control the haptic feedback device to activate when the physiological signal value is greater than the physiological signal threshold.

8. The system for measuring a physiological signal according to claim 6, wherein reminding information of the first-type error comprises at least one of auditory feedback information, haptic feedback information, or visual feedback information, wherein the haptic feedback information is different from the haptic feedback signal.

9. The system for measuring a physiological signal according to claim 6, wherein the physiological signal acquisition device comprises at least one of an electrocardioelectric sensor, an electroencephaloelectric sensor, an electromyoelectric sensor, a skin inductance sensor, a photovoltaic scanning sensor, an infrared light spectrum sensor, or a respiratory sensor.

10. The system for measuring a physiological signal according to claim 6, wherein the haptic feedback device comprises vibrating elements or knocking elements.

11. A wearable device, comprising a system for measuring a physiological signal of claim 6.

* * * * *